(12) United States Patent
Strickler et al.

(10) Patent No.: US 6,858,306 B1
(45) Date of Patent: Feb. 22, 2005

(54) GLASS ARTICLE HAVING A SOLAR CONTROL COATING

(75) Inventors: David A. Strickler, Toledo, OH (US); Kevin D. Sanderson, Wigan (GB); Srikanth Varanasi, Toledo, OH (US); Ronald D. Goodman, Toledo, OH (US)

(73) Assignees: Pilkington North America Inc., Toledo, OH (US); Pilkington PLC, St. Helens (GB)

( * ) Notice: Subject to any disclaimer, the term of this patent is extended or adjusted under 35 U.S.C. 154(b) by 417 days.

(21) Appl. No.: 09/625,921

(22) Filed: Jul. 26, 2000

Related U.S. Application Data
(60) Provisional application No. 60/148,030, filed on Aug. 10, 1999.

(51) Int. Cl.$^7$ ................................................ B32B 15/00
(52) U.S. Cl. ....................... 428/432; 428/212; 428/426; 428/336; 359/350; 359/359; 65/60.1; 65/397
(58) Field of Search ................................ 428/426, 432, 428/336, 212; 65/397, 60.1; 359/350, 359

(56) References Cited

U.S. PATENT DOCUMENTS

| | | | |
|---|---|---|---|
| 4,187,336 A | * | 2/1980 | Gordon |
| 4,206,252 A | * | 6/1980 | Gordon |
| 4,419,386 A | * | 12/1983 | Gordon |
| 5,780,149 A | * | 7/1998 | McCurdy et al. |
| 6,218,018 B1 | * | 4/2001 | McKown et al. ............ 428/432 |
| 6,231,971 B1 | * | 5/2001 | Terneu et al. |

FOREIGN PATENT DOCUMENTS

| | | |
|---|---|---|
| EP | 0708063 A | 4/1996 |
| EP | 0983972 A | 3/2000 |
| GB | 2302102 A | 1/1997 |

OTHER PUBLICATIONS

St Jema B et al: "Optical and electrical properties fo radio frequency sputtered tin oxide films doped with oxygen vacancies, f, sb, or mo", Journal of Applied Physics, American Institue of Physics. New York, US, vol. 76, No. 6, Sep. 15, 1994, pp. 3797–3817, XP002140560 ISSN: 0021–8970 The Whole Document.

* cited by examiner

Primary Examiner—Rena Dye
Assistant Examiner—Tamra L Dicus
(74) Attorney, Agent, or Firm—Marshall & Melhonr, LLC

(57) ABSTRACT

A glass article having a solar control coating is disclosed for use in producing heat reducing glass especially for use in architectural windows. The coated article includes a glass substrate, a coating of an antimony doped tin oxide deposited on and adhering to the glass substrate and a coating of fluorine doped tin oxide deposited on and adhering to the surface of the coating of antimony doped tin oxide. The low emittance of the coated glass article, when combined with the surprisingly selective solar absorption of the multilayer stack provides improved heat rejection in summer and heat retention in winter, while permitting the transmittance of a relatively high degree of visible light.

27 Claims, 1 Drawing Sheet

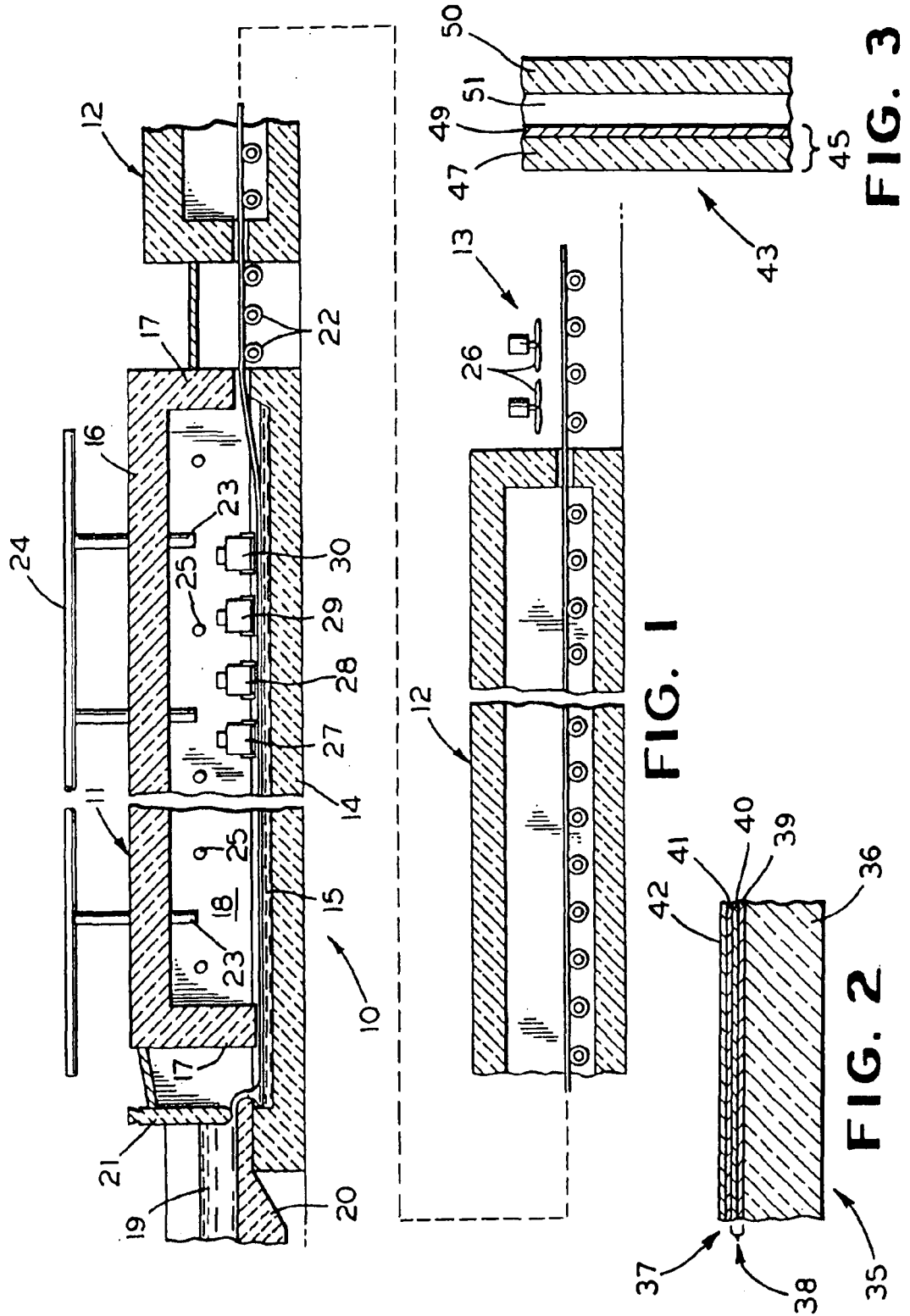

GLASS ARTICLE HAVING A SOLAR CONTROL COATING

RELATED APPLICATION

This application is claiming the benefit, under 35 U.S.C. § 119(e), of the provisional application filed Aug. 10, 1999, under 35 U.S.C. § 111(b), which was granted Ser. No. 60/148,030, and is hereby incorporated by reference.

BACKGROUND OF THE INVENTION

1. Field of the Invention

This invention relates to a coated glass article having a solar control coating. More particularly, this invention relates to a glass article having a multilayer coating and exhibiting high visible light transmittance with low total solar energy transmittance.

2. Summary of Related Art

Coatings on architectural glass are commonly utilized to provide specific energy absorption and light transmittance properties. Additionally, coatings provide desired reflective or spectral properties that are aesthetically pleasing. The coated articles are often used singularly or in combination with other coated articles to form a glazing or window unit.

Coated glass articles are typically produced "on-line" by continuously coating a glass substrate while it is being manufactured in a process known in the art as the "float glass process". Additionally, coated glass articles are produced "off-line" through a sputtering process. The former process involves casting glass onto a molten tin bath which is suitably enclosed, thereafter transferring the glass, after it is sufficiently cooled, to lift out rolls which are aligned with the bath, and finally cooling the glass as it advances across the rolls, initially through a lehr and thereafter while exposed to the ambient atmosphere. A non-oxidizing atmosphere is maintained in the float portion of the process, while the glass is in contact with the molten tin bath, to prevent oxidation of tin. An oxidizing atmosphere is maintained in the lehr. In general, the coatings are applied onto the glass substrate in the float bath of the float bath process. However, coatings may also be applied onto the substrate in the lehr.

The attributes of the resulting coated glass substrate are dependent upon the specific coatings applied during the float glass process or an off-line sputtering process. The coating compositions and thicknesses impart energy absorption and light transmittance properties within the coated article while also affecting the spectral properties. Desired attributes may be obtainable by adjusting the compositions or thicknesses of the coating layer or layers. However, adjustments to enhance a specific property can adversely impact other transmittance or spectral properties of the coated glass article. Obtaining desired spectral properties is often difficult when trying to combine specific energy absorption and light transmittance properties in a coated glass article.

It would be advantageous to provide a coated glass article having a neutral tint that rejects solar energy in the summer and provides a low U value for the winter. A solar reducing glazing with a low emittance, and a low total solar energy transmittance, would significantly improve energy costs in buildings and homes while providing a desirable neutral tint.

It would also be advantageous to provide a solar reducing glazing that has a color neutral reflectance, a low emittance, a high visible light transmittance, and a low total solar energy transmittance. The use of such a neutral colored article in architectural glazings would permit the transmission of a high degree of visible light while rejecting a significant amount of near infrared energy. Furthermore, the low emittance characteristic of the glazing would minimize any indirect heat gain from absorption.

SUMMARY OF THE INVENTION

In accordance with the invention, there is provided a novel glass article useful for producing coated, heat reducing glass for architectural windows. The coated article includes a glass substrate, a coating of an antimony doped tin oxide deposited on and adhering to the glass substrate and a coating of fluorine doped tin oxide deposited on and adhering to the surface of the coating of antimony doped tin oxide.

The coated glass article of the invention has a selectivity of 13 or more, preferably 14 or more, the selectivity being defined as the difference between visible light transmittance (Illuminant C) and total solar energy transmittance, integrated with an air mass 1.5. Alternatively, or in addition, the coated glass article may comprise a coating which provides, when applied to a clear glass substrate at a nominal 3 mm thickness, a selectivity of 13 or more, preferably 14 or more. The coated glass article has a visible light transmittance of 63% or more and a preferred total solar energy transmittance of 53% or less.

Preferably, the coated glass article includes an iridescence-suppressing interlayer deposited between the glass substrate and the coating of antimony doped tin oxide. The coatings are such as to provide a neutral color in transmittance and reflectance when applied to a clear glass substrate.

The antimony doped tin oxide coating in the coated glass article of the invention provides for the absorption of solar energy. While this includes the absorption of some visible light, the antimony doped tin oxide coating is relatively selective, absorbing more near infrared energy than visible light. The antimony doped oxide coating thus reduces the total solar energy transmittance of the coated glass article of the invention.

The fluorine doped tin oxide coating lowers the emissivity of the coated glass article of the invention to less than 0.2, and preferably to less than 0.15. As part of an insulating glass unit, the low emittance value provides a winter time U value of less than 0.4, and preferably less than 0.35. In addition, it has surprisingly been determined that providing the fluorine doped tin oxide coating over the antimony doped tin oxide coating in accordance with the invention enhances the selectivity of the coated glass article.

The specific coating stack on the glass substrate provides a neutral colored article having a high visible light transmittance, a reduced total solar energy transmittance, and .a low emittance. The use of the inventive article in architectural glazings results in a glazing that rejects solar energy in the summer and a provides a low U value for the winter.

It is an object of the invention to provide a neutral colored architectural glazing that transmits a high degree of visible light and significantly reduces the amount of solar energy transmitted.

It is a further object of the invention to provide an architectural glazing having a low emittance to minimize the indirect gain from absorption.

It is also an object of the invention to provide a coated glass article suitable for use as an architectural glazing having a neutral color in both reflectance and transmittance while maintaining the desired emittance and solar energy transmittance properties. We have found that, by appropriate choice of thicknesses of the individual layers, the coating-;stacks of the invention can be produced with both the desired high selectivity and neutral color.

BRIEF DESCRIPTION OF THE DRAWINGS

The above, as well as other advantages of the present invention, will become readily apparent to those skilled in the art from the following detailed description when considered in the light of the accompanying drawings in which:

FIG. 1 is a schematic view, in vertical section, of an apparatus for practicing the float glass process, which includes four gas distributors suitably positioned in the float bath to apply coatings onto the glass substrate in accordance with the invention;

FIG. 2 is a broken sectional view of a coated glass article according to the invention; and FIG. 3 is a diagram of an architectural glazing in accordance with the present invention, wherein the coated glass article is shown in an insulated glass unit as an outboard lite with the multilayer coating of the invention facing the interior.

DETAILED DESCRIPTION OF THE PREFERRED EMBODIMENTS

In accordance with the invention, it has surprisingly been discovered that a coated glass article having a multilayered coating of an antimony doped tin oxide layer over which a fluorine doped tin oxide layer is applied provides an article which exhibits a low emittance, a high visible light transmittance, and a reduced total solar energy transmittance. The coated glass article is especially suitable for use in architectural glazings and windows. However, the coated glass article of the present invention may also be suitable for other applications, such as vehicle windows.

Preferably, the coated glass article includes an iridescence-suppressing interlayer deposited between the glass substrate and the coating of antimony doped tin oxide. The coatings are such as to provide a neutral color in transmittance and reflectance when applied to a clear glass substrate.

FIG. 2 illustrates the coated glass article of the invention, indicated generally at 35, comprising a glass substrate 36 and a multilayered coating 37 adhered to one surface thereof. In the preferred embodiment illustrated, the multi-layered coating comprises an iridescence-suppressing interlayer 38, a coating of antimony doped tin oxide 41, and an outer coating of a fluorine doped tin oxide 42. In the embodiment illustrated, the iridescence-suppressing interlayer 38 is specifically comprised of a tin oxide coating 39 and a silicon dioxide coating 40.

The antimony doped tin oxide coating 41 in the coated glass article of the invention provides especially for the absorption of solar energy. While this includes the absorption of some visible light, the antimony doped tin oxide-.coating is relatively selective, absorbing more near infrared energy than visible light. The antimony doped oxide coating thus reduces the total solar energy transmittance of the coated glass article of the invention.

The antimony doped tin oxide coating 41 includes a molar ratio of antimony to tin of between about 0.05 and 0.12. Preferably, the molar ratio of antimony to tin is between about 0.06 and 0.10, and is most preferably about 0.07. The antimony doped tin oxide coating 41 is applied at a thickness of from about 1400 to about 2000 Angstroms, and preferably from about 1700 to about 1800 Angstroms. As the thickness of the tin oxide coating, doped with antimony in the indicated molar ratio range, is increased above 2000 Angstroms, the absorption of visible light increases to the point that the visible light transmittance is undesirably low. However, as the thickness of the tin oxide coating, doped with antimony in the indicated molar ratio range, is decreased below 1400 Angstroms, the total solar energy transmission becomes undesirably high.

The fluorine doped tin oxide coating 42 lowers the emissivity of the coated glass article of the invention to less than 0.2, and preferably to less than 0.15. As part of an insulating glass unit, the low emittance value provides a winter time U value of less than 0.4, and preferably less than 0.35. In addition, it has surprisingly been determined that a multilayer coating stack in accordance with the invention exhibits enhanced selectivity relative to either a fluorine doped tin oxide coating or an antimony doped tin oxide coating alone.

The fluorine doped tin oxide coating 42 includes sufficient fluorine doping to provide the emittance indicated above. The fluorine doped tin oxide coating 42 is applied at a thickness of from about 2200 to about 3500 Angstroms, and preferably from about 2800 to about 3200 Angstroms.

The iridescence-suppressing interlayer 38 of the coating stack on the glass substrate 36 provides a means to reflect and refract light to interfere with the observance of iridescence. The layer specifically eliminates iridescence so that the coated article may, if desired, be neutral colored in both reflectance and transmittance. Furthermore, the interlayer suppresses the observance of off angle colors. Iridescence-suppressing coatings are conventionally known within the art. For example, U.S. Pat. Nos. 4,187,336, 4,419,386, and 4,206,252, herein incorporated by reference, describe coating techniques suitable for suppressing interference colors. Single layer, multiple layer, or gradient layer color suppression coatings are suitable for use with the present invention.

In the two component interlayer 38 illustrated in FIG. 2, which is the preferred type of iridescence-suppressing interlayer for use in the practice of the present invention, the coating 39 deposited onto and adhering to the glass substrate has a high refractive index in the visible spectrum and is preferably tin oxide. The second coating 40, having a low refractive index, is deposited on and adheres to the first coating of the interlayer, and is preferably silicon dioxide. Generally, each coating has a thickness selected such that the interlayer forms a combined total optical thickness of about ⅛th to about ¹⁄₁₂th of a 500 nm design wavelength.

The glass substrates suitable for use in preparing the coated glass article according to the present invention may include any of the conventional glass compositions known in the art as useful for the preparation of architectural glazings. The preferred substrate is a clear float glass ribbon wherein the coatings of the present invention are applied in the heated zone of the float glass process. Additionally, tinted glass substrates may be suitable for applying the multilayered stack of the invention. However, certain tinted glass substrates may impact the spectral and energy transmittance properties of the invention.

The specific. coating stack on the glass substrate provides a coated glass article having a high visible light transmittance, a reduced total solar energy transmittance, and a low emittance. The coated glass article of the invention has a selectivity of 13 or more, the selectivity being defined as the difference between visible light transmittance (Illuminant C) and a total solar energy transmittance, integrated with an air mass 1.5, on a clear glass substrate at a nominal 3 mm thickness. The selectivity is preferably 14 or more, with a preferred visible light transmittance of 63% or more and a preferred total solar energy transmittance of 53% or less. The emittance of the present inventive article is less than 0.2, and preferably less than 0.15. The use of the inventive article in architectural glazings results in a glazing that rejects solar energy in the summer and provides a low U value for the winter.

The multilayered coatings of the present invention result in a coated glass article exhibiting neutral color in both reflectance and transmittance. The color is defined by the composition and thickness of the various layers of the stack. The $R_g$, or reflective color measured from the glass substrate side of the coated article, preferably has an a* value of about 0 to about −6 and a b* value of about 0 to about −6 as defined on the CIELAB color scale system. The off-angle $R_g$ is neutral due at least in part to the matched refractive indices of the antimony doped tin oxide and fluorine doped tin oxide coatings.

The $R_f$, or reflective color measured from the film side of the coated article, preferably has an a* value of about 5 to about −5 and a b* value of about 5 to about −5 as defined on the CIELAB color scale system but is not deemed to be a critical factor for purposes of the subject invention as in most applications, the viewer will see the glass side reflection due to the surface of the glass sheet on which the film is deposited. The transmitted color of the coated article is aesthetically neutral, having an a* value of about 2 to about −5 and a b* value of about 2 to about −5. The coated glass article also preferably exhibits haze of less than 0.8%.

In order to achieve the above-described color neutrality, it may be desirable to vary the thicknesses of the tin oxide and silica layers of the color between 150 angstroms and 350 angstroms. It is also important that, with respect to the subject invention, color neutrality is not strictly defined by mathematical limits, but also as perceived by the human eye in viewing the glass side reflective color (Rg) and the transmitted color.

The coatings of the article of the invention may be applied by any of the conventional methods generally known in the art. Preferably, the coatings are applied "on-line" onto the glass substrate by chemical vapor deposition during the glass manufacturing process. FIG. 1 illustrates an apparatus, indicated generally at 10, useful for the on-line production of the coated glass article of the present invention, comprising a float section 11, a lehr 12, and a cooling section 13. The float section 11 has a bottom 14 which contains a molten tin bath 15, a roof 16, sidewalls (not shown), and end walls 17, which together form a seal such that there is provided an enclosed zone 18, wherein a non-oxidizing atmosphere is maintained, as hereinafter described in greater detail, to prevent oxidation of the tin bath 15. During operation of the apparatus 10, molten glass 19 is cast onto a hearth 20, and flows therefrom under a metering wall 21, then downwardly onto the surface of the tin bath 15, from which it is removed by lift-out rolls 22 and conveyed through the lehr 12, and thereafter through the cooling section 13.

A non-oxidizing atmosphere is maintained in the float section 11 by introducing a suitable gas, such as for example one composed of 99 percent by volume nitrogen and 1 percent by volume hydrogen, into the zone 18, through conduits 23 which are operably connected to a manifold 24. The non-oxidizing gas is introduced into the zone 18 from the conduits 23 at a rate sufficient to compensate for losses of the gas (some of the non-oxidizing atmosphere leaves the zone 18 by flowing under the end walls 17), and to maintain a slight positive pressure, conveniently about 0.001 to about 0.01 atmospheres above ambient pressure. The tin bath 15 and the enclosed zone 18 are heated by radiant heat directed downwardly from heaters 25. The heat zone 18 is generally maintained at a temperature of about 1200° F. The atmosphere in the lehr 12 is typically air, and the cooling section 13 is not enclosed. Ambient air is blown onto the glass by fans 26.

The apparatus 10 also includes gas distributors 27, 28, 29 and 30 located in the float zone 11. The desired precursor mixtures for the individual coatings are supplied to the respective gas distributors, which in turn direct the precursor mixtures to the hot surface of the glass ribbon. The precursors react at the glass surface to form the desired coatings.

The coated glass article of the invention is ideally suited for use in architectural glazings. For example, the coated glass article may be utilized in an insulated glass unit. Thus, the coated glass article of the present invention is illustrated in FIG. 3 as an outboard lite 45 in an insulated glass unit 43 suitable for installation into a building structure. The insulated glass unit 43 also includes an inboard lite 50 made of a glass article and maintained in a spaced apart relationship from the outboard lite 45 by a frame (not shown) in the known manner. The glass substrate 47 of the present invention is positioned facing the exterior of the structure. The multilayerd coating 49 of the present invention faces the interior with an air space 51 separating the outboard lite 44 from the inboard lite 50.

The low emittance provided by the fluorine doped tin oxide improves the performance of the coated glass article in the summer and winter. The radiation energy, a component of the indirect gain from the glass to the building interior, is reduced under summer conditions with a low emittance coating. This is noticed as a reduction in the total solar heat transmittance (TSHT). TSHT is defined as including solar energy transmitted directly through the glass, and the solar energy absorbed by the glass, and subsequently convected and thermally radiated inwardly. The major improvement in performance however occurs under winter conditions where the U-value of the glazing structure is reduced significantly with a low emittance coating. The U-value or the overall heat transfer coefficient is inversely proportional to the thermal resistance of the structure. A lower U-value means a reduction in heat loss through the glass from the interior to the exterior, resulting in savings in energy costs. Thus, the low emittance of the coated glass article, when combined with the surprisingly selective solar absorption of the multilayer stack provides improved heat rejection in summer and heat retention in winter.

The resulting insulated glass unit, utilizing the coated glass article of the present invention, exhibits specific transmittance and spectral properties. The low emittance of surface 49 (FIG. 3) results in a U value of less than 0.4 and preferably less than 0.35. The total solar heat transmittance of the unit is 48% or less. The insulated glass unit also exhibits a visible light transmittance (Illuminant C) of 59% or more.

The insulated glass unit exhibits a neutral color in both reflectance and transmittance.

The following examples, which constitute the best mode presently contemplated for practicing the invention, are presented solely for the purpose of further illustrating and disclosing the present invention, and are not to be construed as a limitation on the invention.

PREDICTIVE EXAMPLES 1–15

A float glass process is used to produce a float glass ribbon having a thickness of ⅛ inch. During the production of the float glass ribbon, the specified coatings are consecutively applied onto the glass substrate in the float bath through conventional chemical vapor deposition methods at the thicknesses (in Angstroms) indicated in Table 1. The precursor mixture for the various tin oxide coatings includes dimethyl tin dichloride, oxygen, water, and helium as a carrier gas. In the case of the antimony doped tin oxide, the precursor mixture also includes antimony trichloride in ethyl acetate, while in the case of the fluorine doped tin oxide the precursor mixture also includes hydrofluoric acid. The precursor mixture for the silicon dioxide coating includes monosilane, ethylene, and oxygen and a carrier gas. In each case, the antimony doped tin oxide layer includes an antimony to tin molar ratio of 0.07.

Examples 1–4, 9 and 12 are presented for comparative purposes, having an antimony doped tin oxide coating, but no fluorine doped tin oxide coating. Examples 5, 6, 10, 11 and 13 are also presented for comparative purposes, having a fluorine. doped tin oxide coating, but no antimony doped tin oxide coating.

The visible light transmittance ($T_{vis}$), total solar energy transmittance ($T_{sol}$) and the selectivity ($T_{vis}-T_{sol}$) were calculated for the resulting coated glass article in each example. The results are shown in Table 1.

TABLE 1

| Ex. | SnO$_2$ | SiO$_2$ | SnO$_2$:Sb | SnO$_2$:F | $T_{vis}$ (%) | $T_{sol}$ (%) | $T_{vis} - T_{sol}$ |
|---|---|---|---|---|---|---|---|
| 1 | 250 | 250 | 1500 | 0 | 68.76 | 57.49 | 11.25 |
| 2 | 250 | 250 | 1800 | 0 | 65.22 | 53.66 | 11.56 |
| 3 | 250 | 250 | 2400 | 0 | 59.51 | 47.03 | 12.48 |
| 4 | 250 | 250 | 4500 | 0 | 43.5 | 30.87 | 12.63 |
| 5 | 250 | 250 | 0 | 2400 | 82.52 | 74.31 | 8.21 |
| 6 | 250 | 250 | 0 | 3000 | 84.05 | 73.14 | 10.91 |
| 7 | 250 | 250 | 1800 | 3000 | 63.64 | 49.63 | 14.01 |
| 8 | 250 | 250 | 2400 | 2400 | 57.32 | 44.26 | 13.06 |
| 9 | 0 | 0 | 4800 | 0 | 41.56 | 29.36 | 12.2 |
| 10 | 0 | 0 | 0 | 4500 | 82.91 | 70.81 | 12.1 |
| 11 | 0 | 0 | 0 | 4800 | 81.89 | 70.89 | 11.0 |
| 12 | 250 | 250 | 4800 | 0 | 41.51 | 29.16 | 12.35 |
| 13 | 250 | 250 | 0 | 4800 | 82.36 | 70.46 | 11.9 |
| 14 | 250 | 250 | 4800 | 4800 | 39.79 | 27.18 | 12.61 |
| 15 | 250 | 250 | 1500 | 3000 | 66.77 | 52.76 | 14.01 |
| 16 | 240 | 200 | 1800 | 3000 | 63.63 | 49.69 | 13.94 |
| 17 | 220 | 200 | 1500 | 3000 | 66.82 | 52.88 | 13.94 |

The enhanced selectivity obtained with the multilayer coating stack of the invention is evident from viewing the above examples. For instance, it is noted that the glass article of example 12, which includes a two layer color suppression interlayer and 4800 Angstroms of antimony doped tin oxide, has a selectivity of 12.35. The glass article of example 13, which includes the same two layer color suppression interlayer and 4800 Angstroms of fluorine doped tin oxide, only has a selectivity of 11.9.

In contrast, the coated glass article of example 8 has the same two layer color suppression interlayer with 2400 Angstroms of antimony doped tin oxide and 2400 Angstroms of fluorine doped tin oxide. Thus, despite having the same total coating thickness, the article of example 8 has a selectivity of 13.06, although it has a $T_{vis}$ of only 57.32 due to the relatively thick antimony doped tin oxide coating. The coated glass article of example 7 has the same two layer color suppression interlayer with 1800 Angstroms of antimony doped tin oxide and 3000 Angstroms of fluorine doped tin oxide. The article of example 7 again has the same total coating thickness, but has a selectivity of 14.01, with a $T_{vis}$ of 63.64 and a Tsol of 49.63.

Further analysis of Examples 16 and 17 in Table 1 shows that "tuning" of the color suppression layers to enhance color neutrality can be accomplished while maintaining the selectivity above 13. Predicted color values for Example 16 are transmitted color (T) a*–1.87 and b*–0.03 and reflected glass side color (Rg) a*–5.97 and b*–3.88. Comparable color values for Example 17 are (T) a*–1.58 and b*0.65, (Rg)a*–3.45 and b*–5.29. It is clear from comparing the above color values to Examples 7 and 15 which have predicted color values of (T) a*–1.8 and b*–0.13 and (Rg)a*–6.21 and b*–3.49 and (T) a*–2.15 and b* 1.14 and (Rg) a*–0.81 and b*–7.33, respectively, that the color can be significantly affected by varying layer thickness, but still remaining within the desired color ranges to provide an aesthetically pleasing, "neutral" colored glass.

In accordance with the provisions of the patent statutes, the present invention has been described in what is considered to represent its preferred embodiment. However, it should be noted that the invention can be practiced otherwise than as specifically illustrated and described without departing from its spirit and scope. For example, other coating methods, such as sputtering, may also be utilized to form the solar control coating of the present invention.

What is claimed is:

1. A coated glass article comprising:
   (a) a glass substrate;
   (b) a coating of antimony doped tin oxide deposited on and adhering to said glass substrate; and
   (c) a coating of fluorine doped tin oxide deposited on and adhering to said coating of antimony doped tin oxide, with the thickness of said coatings selected so that said coated glass article exhibits a difference between visible light transmittance (Illuminant C) and total solar energy transmittance, integrated with an air mass 1.5 on a clear glass substrate at a nominal 3 mm thickness, to provide a selectivity of 13 or more and wherein said coating glass article has an emittance less than or equal to about 0.02.

2. The coated glass article of claim 1, wherein said coating of antimony doped tin oxide has a thickness of between about 1400 and 2400 angstroms.

3. The coated glass article of claim 2, wherein said coating of antimony doped tin oxide has a thickness of between about 1400 and 1900 angstroms.

4. The coated glass article of claim 3, wherein said coating of antimony doped tin oxide is about 1700 to about 1800 Angstroms thick.

5. The coated glass article of claim 1, wherein said coating of fluorine doped tin oxide has a thickness of between about 2000 and 3500 angstroms.

6. The coated glass article of claim 5, wherein said coating of fluorine doped tin oxide has a thickness of between about 2200 and 3500 angstroms.

7. The coated glass article of claim 6, wherein said coating of fluorine doped tin oxide is about 3200 Angstroms thick.

8. The coated glass article of claim 1, wherein said coated glass or equal to about 0.15.

9. The coated glass article of claim 1, wherein said glass substrate is a clear float glass ribbon.

10. The coated glass article of claim 1, wherein said article exhibits a neutral color in glass side reflectance as defined in the CIELAB system having an a* value from about 0 to about –6 and a b* value of about 0 to about –6.

11. The coated glass article of claim 1, wherein the molar ratio of antimony to tin in the antimony doped tin oxide coating is between about 0.05 and 0.12.

12. The coated glass article of claim 1, wherein said coated glass article exhibits a visible light transmittance (Illuminant C) of 63% or more and a total solar energy transmittance integrated with an air mass 1.5 of 53% or less on a clear glass substrate at a nominal 3 mm thickness.

13. The coated glass article of claim 1, wherein said coated glass article exhibits a visible light transmittance (Illuminant C) of 59% or more and a total solar energy transmittance integrated with an air mass 1.5 of 49% or less on a clear glass substrate at a nominal 3 mm thickness.

14. An insulating glass unit for architectural windows, including a coated glass article as defined in claim 1.

15. The insulating glass unit of claim 14, wherein said insulated glass unit has a U value less than 0.4.

16. The coated glass article of claim 1, further comprising an iridescence-suppressing interlayer between said glass substrate and said coating of antimony doped tin oxide.

17. The coated glass article of claim 16, wherein said coated glass article has a visible light transmittance (Illuminant C) of 63% or more and a total solar energy transmittance integrated with an air mass 1.5 of 53% or less on a clear glass substrate at a nominal 3 mm thickness, and exhibits a neutral color in glass side reflectance as defined in the CIELAB system having an a* value from about 0 to about −6 and a b* value of about 0 to about −6.

18. The coated glass article of claim 16, wherein said iridescence suppressing interlayer comprises a layer of undoped tin oxide, and deposited on and adhering to said layer of undoped tin oxide, a layer of silica.

19. The coated glass article of claim 18, wherein the total optical thickness of said undoped tin oxide layer and said silica layer is from 1/6th to 1/12th of a 500 nm design wavelength.

20. The coated glass article of claim 18, wherein said undoped tin oxide layer has a thickness of between about 150–350 angstroms, and said silica layer has a thickness of between about 150–350 angstroms.

21. An insulating glass unit comprising:
(a) a first glass substrate;
(b) a second glass substrate having an inner surface and an outer surface, said second glass substrate being secured to said first glass substrate in a spaced apart relationship with said inner surface facing said first glass substrate; and
(c) a multilayer coating stack deposited on and adhered to said inner surface of said second glass substrate, said multilayer coating stack comprising:
(i) a coating of antimony doped tin oxide deposited on and adhering to said inner surface, said coating of antimony doped tin oxide having a thickness of between about 1400 and 1900 Angstroms; and
(ii) a coating of fluorine doped tin oxide deposited on and adhering to said coating of antimony doped tin oxide, said coating of fluorine doped tin oxide having a thickness of between about 2200 and 3500 Angstroms;
said multilayer coating being such that said second glass substrate exhibits a difference between visible light transmittance (Illuminant C) and total solar energy transmittance, integrated with an air mass 1.5 on a clear glass substrate at a nominal 3 mm thickness, of 13 or more and wherein said coated glass article has an emittance less than or equal to 0.2.

22. The insulating glass unit of claim 21, wherein said insulating glass unit has a U value less than 0.4.

23. The insulating glass unit of claim 21, wherein said insulating glass unit has a U value which is at least 15% less than the U Value of an insulating glass unit of the same construction but utilizing two panes of uncoated glass.

24. The insulating glass unit of claim 21, wherein the total solar energy transmittance is at least 25% less than the total solar energy transmittance of an insulating glass unit of the same construction but utilizing two panes of uncoated glass.

25. A coated glass article comprising:
(a) a glass substrate;
(b) a coating of antimony doped tin oxide deposited on and adhering to said glass substrate, said coating of antimony doped tin oxide having a thickness of between about 1400 and 1900 Angstroms; and
(c) a coating of fluorine doped tin oxide deposited on and adhering to said coating of antimony doped tin oxide, said coating of fluorine doped tin oxide having a thickness of between about 2200 and 3500 Angstroms;
said coated glass article exhibiting a difference between visible light transmittance (Illuminate C) and total solar energy transmittance, integrated with an air mass 1.5 on a clear glass substitute at a nominal 3 mm thickness, to provide a selectivity of 13 or more and wherein said coated glass article has an emittance less than or equal to 0.2.

26. The coated glass article of claim 25, wherein said coated glass article has an emittance less than or equal to about 0.15.

27. The coated glass article of claim 25, wherein said article exhibits a neutral color in glass side reflectance as defined in the CIELAB system having an a* value from about 0 to about −6 and a b*value of about 0 to about −6.

* * * * *

UNITED STATES PATENT AND TRADEMARK OFFICE
CERTIFICATE OF CORRECTION

PATENT NO. : 6,858,306 B2
DATED : February 22, 2005
INVENTOR(S) : Strickler et al.

It is certified that error appears in the above-identified patent and that said Letters Patent is hereby corrected as shown below:

Column 8,
Line 38, delete "0.02" and replace with -- 0.2 --.
Line 54, after "about" insert -- 2800 to about --.
Line 55, after "glass" insert -- article has an emittance less than --.

Column 10,
Line 36, delete "(Illuminate C)" and replace with -- (Illuminant C) --.
Line 38, delete "substitute" and replace with -- substrate --.
Line 41, before "0.2" insert -- about --.

Signed and Sealed this

Twenty-fourth Day of May, 2005

JON W. DUDAS
*Director of the United States Patent and Trademark Office*